1,461,071

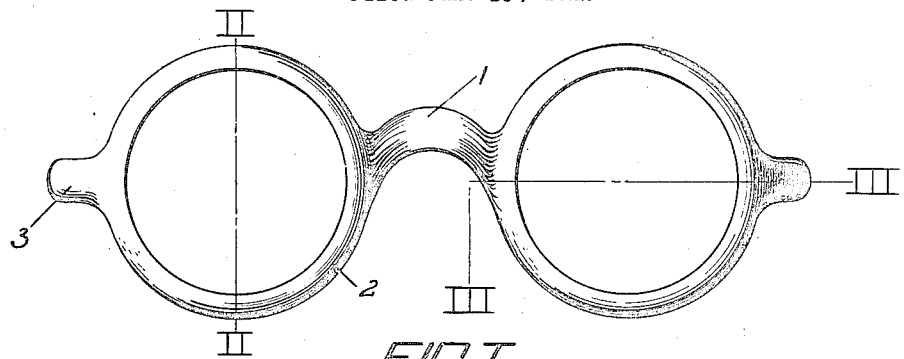
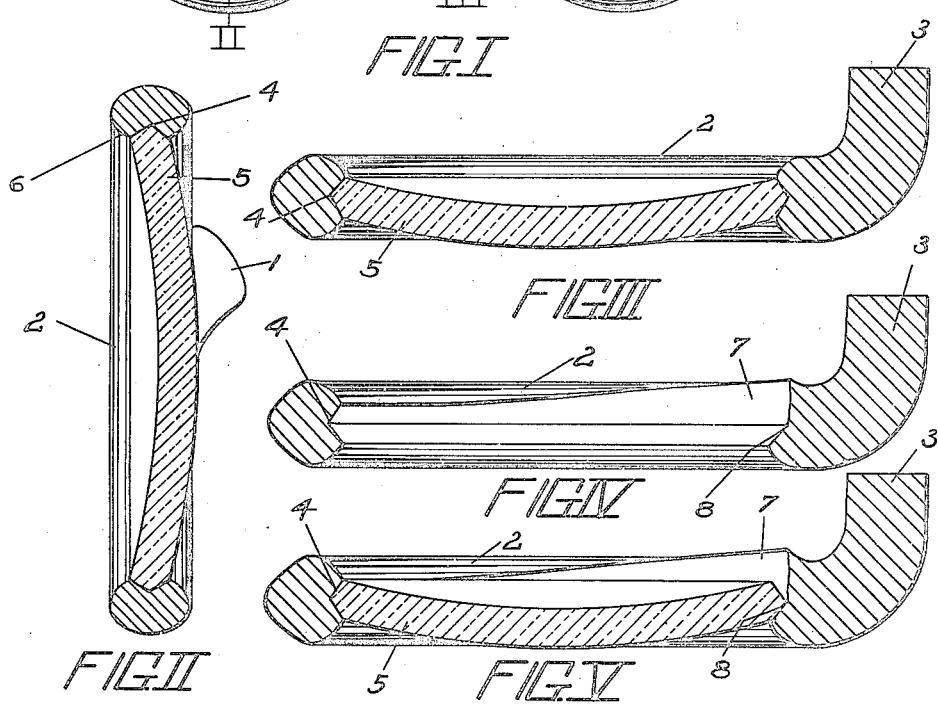
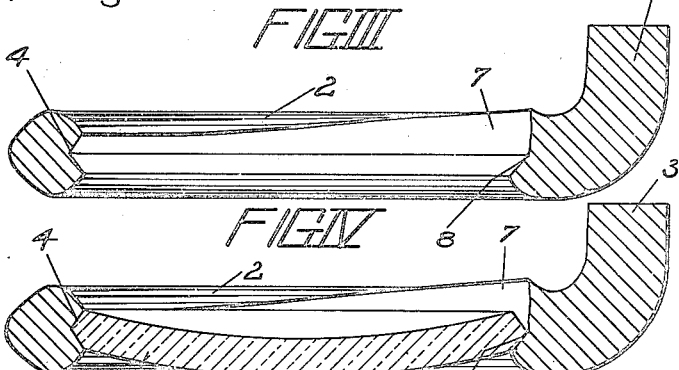
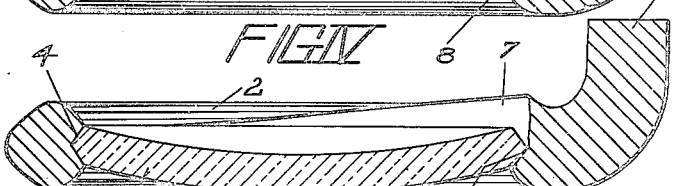
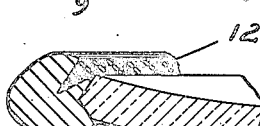
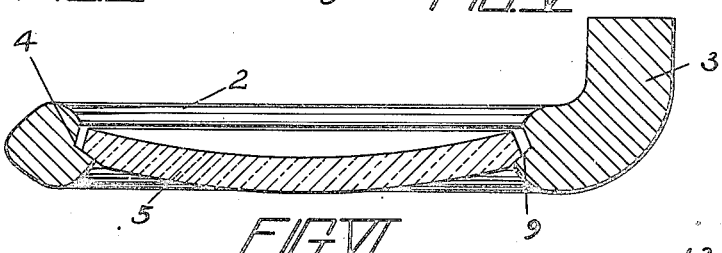
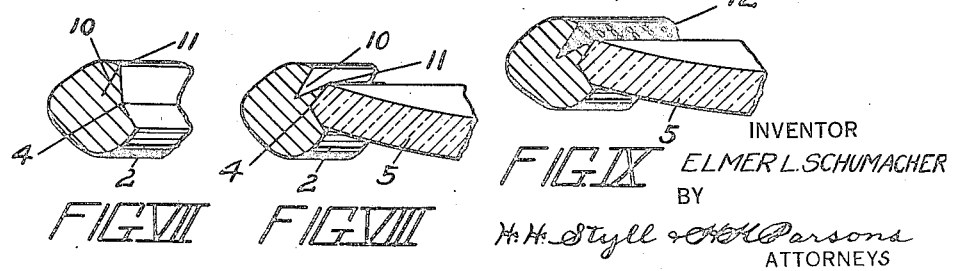
INVENTOR
ELMER L. SCHUMACHER
BY
ATTORNEYS Patented July 10, 1923.

UNITED STATES PATENT OFFICE.

ELMER L. SCHUMACHER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed January 19, 1922. Serial No. 530,278.

*To all whom it may concern:*

Be it known that I, ELMER L. SCHUMACHER, a citizen of the United States, residing at Southbridge, in the county of Worcester and State of Massachusetts, have invented certain new and useful Improvements in Ophthalmic Mountings, of which the following is a specification.

This invention relates to improvements in ophthalmic mountings and has particular reference to mountings formed from non-metallic material.

One of the principal objects of the present invention is the provision of a novel and improved construction of non-metallic mounting and a novel process of using said mounting which will greatly facilitate the insertion and correct positioning and securing of lenses therein.

A further object of the present invention is the provision of an improved structure and process which will greatly reduce the breakage both of frames and lenses during the mounting operation.

Other objects and advantages of my invention should be readily apparent by reference to the following specification taken in connection with the accompanying drawings, and it will be understood that I may make any modifications in the specific features of construction shown and described within the scope of the appended claims without departing from or exceeding the spirit of my invention.

Figure I represents a front view of a mounting constructed in accordance with and embodying my improvements.

Figure II represents a sectional view taken as on the line II—II of Figure I.

Figure III represents a similar view on the line III—III.

Figure IV represents a view similar to Figure III with the frame in condition to receive a lens.

Figure V is a similar view showing the lens loosely positioned within the frame but unsecured.

Figure VI represents a view similar to Figure V illustrating a modification of my invention.

Figure VII represents a fragmentary sectional view of another embodiment thereof.

Figure VIII represents a view of the device of Figure VII with lens in position.

Figure IX represents a view of the final securing of the lens.

In the drawings, in which similar characters of reference are employed to denote corresponding parts throughout the several views, the numeral 1 designates the bridge of a non-metallic or composition frame preferably formed from zylonite, celluloid, or similar material, having the lens receiving rim or frame portions 2 which may be either integral with or separate from the bridge, as desired. These frames are shown as provided with the end piece portions 3 for attachment of temples and as of one piece or unsplit form.

I am aware that prior to my invention frames of this general type have been made and that the practice has been to spring or snap the lens into place in the frame either when the frame is cold or sometimes through the use of heat softening the frame somewhat to facilitate working with it. In my invention, however, I make use of an entirely new principle or method of operation. It is a well recognized fact that composition material of this sort has a great tendency to resume its original form; that is to say, the material may be heated and shaped and if allowed to cool in the shaped or molded form will remain in that form until subsequently heated when, as for example in a seamed tube, U-shaped member, or the like, formed from flat stock, the same will tend to flatten out into its original sheet form. It is this inherent principle of the material involved that I wish to utilize in the present invention. This I accomplish by forming my entire rim or entire frame, as the case may be, from a single piece of sheet material properly blanked out and subsequently milled to form the lens receiving groove 4, in which fits the lens 5, the frame, if desired, both for appearance and to facilitate snapping of the lens into the groove, being also exteriorly bevelled adjacent the groove as at 6. The parts having been thus formed from sheet material this is their natural form.

My invention next comprises distorting certain of the parts from the normal form to a different shape and setting them in this shape. This will be best understood by reference, for example, to Figure IV, from which it will be seen that after the frame has been suitably grooved I heat and mould one wall of the groove 4 throughout a suitable portion of its length to open out the groove, as is indicated at 7 in Figure IV. The result is that the lens may be slipped into the groove 4 at one side of the frame and will drop down against the front wall 8 of the groove 4 so that its forward movement is limited but will move freely by the displaced rear wall of the groove, as indicated at 7. The lens being in this position and properly disposed as to axis within the frame, it is then merely necessary to suitably heat the frame either by hot plate, emersion in hot water, or the like, when the material will tend to resume its normal form and the displaced portion at 7 will roll back and contract against the lens securely gripping and holding the lens.

As an alternative to this feature I may make use of the principle illustrated in Figure VI, in which I form the rear point or annulus bounding the groove 4 of greater diameter than the front face, and by suitably inserted eye plates stretch the entire frame until this annulus, as as 9, is of substantially the same perimeter as the normal perimeter of the bottom of the groove 4. This is done while the frame is heated and it is then while stretched suitably chilled or otherwise caused to set to this form. The frame may then be sold in this condition and when it is desired to make use of it the lens is edged as indicated in Figure VI to proper size for which the frame is constructed, when it will just slip down past the annulus 9 and will rest against the front wall 8 of the groove which will limit its movement through the frame, it then being loosely held within the grooves. Subsequent heating action, however, will release the strains or distortion formely fixed in the material so that the frame will shrink back to its normal size when the lens 5 will be securely held and retained within the groove 4.

This is an extremely desirable way in which to mount the lens, since on account of the stretching by inserted eye plates there is no mutilation of the walls of the groove 4 or injury to the frame, as might occur were attempts made to stretch the frame in any other way. The frame is properly stretched or fitted to receive the lens by the factory so that breakage of the frame when on the market is less liable to occur. The frame will shrink back to properly hold the lens, while at the same time the shrinking power or force of the contracting frame is so slight that there is no danger of damage to the lens on account thereof, while at the same time the shrinkage will be the sufficient amount necessary to properly retain the lens.

Figures VII, VIII and IX show another modification of my invention featuring the same principles, with the addition that in this form a groove 4 is provided for reception of the lens, and a second adjacent groove 10 providing an intermediate annular rib 11. In the further formation of the frame this rib 11 is then moulded back to close up the groove 10 and so open up the groove 4 that the lens may be readily dropped thereinto. As before, the frame is then heated, when the rib or annulus will rise up to grip the lens, as shown in Figure VIII. In this form of construction I then prefer to subsequently fill up the groove 10 either by a liquid composition, as at 12, or the composition of a liquid composition and filler strip, as may be preferred. The relationship of the groove 10 to the groove 4 and to the front wall of the frame is such that in the case of employment of liquid, celluloid, or the like, in closing up the groove the same will also flow slightly over the rib 11 engaging the lens itself and securely cementing the lens to the frame so that liability of twisting or getting off axis of cylinder lenses in round eye frames is eliminated to a very great degree.

I claim:

1. The process of mounting a lens in a non-metallic frame, consisting in forming a rim with a lens receiving groove, displacing a portion of the wall of the groove, causing the wall to set in displaced position, inserting a lens within the groove, and subsequently restoring the displaced portion of the frame to its original position to secure the lens therein.

2. A non-metallic lens frame having a continuous groove formed therein for the reception of a lens and having the wall of the groove stretched to facilitate insertion of the lens.

3. The process of mounting a lens, consisting in forming a composition frame with a lens receiving groove and an adhesive receiving recess, mounting a lens within the groove, and securing the lens in position through the application of an adhesive to the lens in the adhesive receiving recess of the frame.

4. A composition ophthalmic frame having a lens receiving groove formed therein and having an adhesive receiving recess adjacent the groove, substantially as and for the purpose described.

5. A non-metallic lens receiving rim having a lens receiving groove formed therein and having the perimeter of one wall of the groove greater than the other at its inner limit, whereby the lens may be readily inserted at one side of the rim and will be held against forcing through the opposite side thereof, said rim being temporarily held in distorted position whereby a lens of proper size will readly pass into the groove by way of said narrower wall.

6. A non-metallic lens frame having a groove formed therein for the reception of a lens and having a wall of the groove displaced out of its initial set to facilitate the insertion of a lens.

In testimony whereof I have affixed my signature, in presence of two witnesses.

ELMER L. SCHUMACHER.

Witnesses:
SUSAN CABAZZA,
ESTHER M. SAFLER.